United States Patent
Simonds et al.

(10) Patent No.: US 7,426,689 B2
(45) Date of Patent: Sep. 16, 2008

(54) SYSTEM AND METHOD OF PROCESSING TEXT BASED ENTRIES

(75) Inventors: Craig Simonds, Dearborn, MI (US); Garold Myers, Northville, MI (US); Perry Macneille, Lathrup Village, MI (US)

(73) Assignee: Ford Motor Company, Dearborn, MI (US)

( * ) Notice: Subject to any disclaimer, the term of this patent is extended or adjusted under 35 U.S.C. 154(b) by 310 days.

(21) Appl. No.: 11/013,246

(22) Filed: Dec. 15, 2004

(65) Prior Publication Data

US 2006/0129553 A1    Jun. 15, 2006

(51) Int. Cl.
  *G06F 17/21* (2006.01)
  *G06F 17/24* (2006.01)
  *G06F 17/30* (2006.01)

(52) U.S. Cl. .................. 715/234; 715/200; 715/238; 715/239; 715/243; 715/250; 715/254; 715/255; 715/256; 707/3; 707/6

(58) Field of Classification Search .................. 715/513, 715/500.1, 531, 200, 234, 238–239, 243, 715/250, 254–256; 707/3, 6; 455/414.2, 455/414.4; 701/1, 24; 307/9.1, 10.1
See application file for complete search history.

(56) References Cited

U.S. PATENT DOCUMENTS

| | | | |
|---|---|---|---|
| 5,940,803 A | | 8/1999 | Kanemitsu |
| 6,262,735 B1 * | | 7/2001 | Etelapera .................. 715/854 |
| 6,493,671 B1 * | | 12/2002 | Ladd et al. .................. 704/270 |
| 6,505,121 B1 * | | 1/2003 | Russell .................. 701/213 |
| 6,735,516 B1 * | | 5/2004 | Manson .................. 701/209 |
| 2002/0091818 A1 * | | 7/2002 | Cascio et al. .................. 709/224 |
| 2003/0151618 A1 * | | 8/2003 | Johnson et al. .................. 345/716 |
| 2003/0179233 A1 | | 9/2003 | McWalter et al. |
| 2003/0182032 A1 | | 9/2003 | McWalter et al. |
| 2003/0182099 A1 | | 9/2003 | Mocek et al. |
| 2003/0182233 A1 | | 9/2003 | Mocek et al. |
| 2003/0187936 A1 * | | 10/2003 | Bodin et al. .................. 709/206 |
| 2004/0056890 A1 * | | 3/2004 | Hao et al. .................. 345/744 |
| 2004/0083212 A1 * | | 4/2004 | Palmquist .................. 707/4 |
| 2004/0090121 A1 | | 5/2004 | Simonds et al. |

(Continued)

OTHER PUBLICATIONS

"Vehicle Consumer Services Interface from Sun and Ford", Feb. 17, 2003, System News from Sun, Article #9032, vol. 60, Issue 3, p. 1 of 1.*

(Continued)

*Primary Examiner*—Rachna Singh
*Assistant Examiner*—Chau Nguyen
(74) *Attorney, Agent, or Firm*—Jennifer Stec; Price, Heneveld, Cooper, DeWitt & Litton LLP

(57) ABSTRACT

A system and method are provided for identifying text information and making such information available for applications. The system includes an electronic device communicating text information and an application for performing a function. The system also includes memory storing known text formats and a processor for processing the text information. The processor compares the text information to the known text formats and determines a text format of the text information. The processor also tags the text information according to the determined text format and further makes the tagged text information available to one or more applications.

17 Claims, 7 Drawing Sheets

U.S. PATENT DOCUMENTS

| | | | | |
|---|---|---|---|---|
| 2004/0090346 | A1 | 5/2004 | Simonds et al. | |
| 2004/0092253 | A1 | 5/2004 | Simonds et al. | |
| 2004/0093154 | A1 | 5/2004 | Simonds et al. | |
| 2004/0093155 | A1 | 5/2004 | Simonds et al. | |
| 2004/0110522 | A1* | 6/2004 | Howard et al. | 455/512 |
| 2004/0133640 | A1* | 7/2004 | Yeager et al. | 709/204 |
| 2004/0162871 | A1* | 8/2004 | Pabla et al. | 709/201 |
| 2005/0038596 | A1* | 2/2005 | Yang et al. | 701/200 |
| 2005/0094475 | A1* | 5/2005 | Naoi | 365/232 |
| 2005/0143134 | A1* | 6/2005 | Harwood et al. | 455/563 |
| 2005/0197767 | A1* | 9/2005 | Nortrup | 701/209 |
| 2006/0046769 | A1* | 3/2006 | Arun | 455/550.1 |

OTHER PUBLICATIONS

Henner Graubitz, Myra Spiliopoulou and Karsten Winkler, The DIAsDEM Framework for Converting Domain-Specific Texts into XML Documents with Data Mining Techniques, Data Mining, 2001, ICDM 2001, Proceedings IEEE International Conference on Nov. 29-Dec. 2, 2001, pp. 171-178.*

"Mercedes-Benz Unveils Driveby Infofueling Research Car; Driveby Infofueling Car Shows Future Telematics Concepts," COMDEX 2001, Nov. 12, 2001, 2 pages.

SAE Digital Car Conference Abstract, DCC-13-2002, "DriveBy InfoFueling—Telematics Beyond the Anytime Anywhere Paradigm," by Wieland Holfelder, Daimler Chrysler Research Institute, Mar. 2002, 1 page.

* cited by examiner

SYSTEM AND METHOD OF PROCESSING TEXT BASED ENTRIES

BACKGROUND OF THE INVENTION

The present invention generally relates to integration of electronic devices and services, such as those onboard a vehicle and, more particularly, to a system and method of analyzing and identifying text information and making the identified text information available for use in applications.

Electronic devices are frequently employed onboard automotive vehicles. Automotive vehicles includes a number of electronic controllers and related devices that typically employ sensors and control modules that communicate data via proprietary communication protocol(s) on a dedicated vehicle data communication bus. Additionally, many automotive vehicles are also equipped with various infotainment devices, such as an audio radio tuner, a compact disk (CD) or digital versatile disk (DVD) player, a television, and a navigation system. These devices may be individually coupled to a multimedia bus, which is typically separated from the vehicle original equipment manufacturer (OEM) data communication bus.

In addition to the onboard integrated devices, various wireless consumer electronic devices may also be utilized in the vehicle. For example, cellular phones, personal digital assistants (PDAs), such as personal organizers and computers, and digital music players, such as an MP3 player, brought into a vehicle by a passenger may communicate with each other or one or more devices integrated in the vehicle via wire or wireless (e.g., Bluetooth) data communication link(s).

These and other mobile consumer devices offer multiple sources of text and other information that becomes available onboard the vehicle. With the increased availability and integration of device services, some of this information can be useful in providing a wide variety of enhanced tasks and/or objectives. For example, it may be desirable for a vehicle navigation system to provide customized navigation services based on personal information that may become available from various different sources. Much of the text data available in conventional consumer devices is in the form of untagged text (e.g., notes to self or calendar entries), and hence is not readily available. To be able to use this text information, such text needs to be uploaded to the vehicle in an identifiable format. However, manually accessing this text information can be time consuming and distracting.

As future vehicles become even more intelligent and electronic devices and services are further integrated into the vehicle or brought onboard, the total functionality offered by such devices and services will grow. Additionally, different devices employ various text formats, commonly referred to as pro forma, which define a particular type of text information. The use of different text pro formas may be problematic in that it is difficult to process a wide variety of text information when different text formats are available. As a consequence, text information that is available may not be fully utilized.

Accordingly, it is desirable to provide for a system and method of analyzing text information such that the text information may be understood and employed, such as for vehicle related services. In particular, it is desirable to provide for such a system and method that makes the text information available to other devices and services onboard the vehicle to provide for enhanced integration of electronic systems. For example, it is desirable to provide for enhanced integration and operation of various electronic devices and services such as PDAs, cell phones, and navigation systems which are commonly employed onboard vehicles.

SUMMARY OF THE INVENTION

According to one aspect of the present invention, a system is provided for identifying text information and making such information available for one or more applications. The system includes an electronic device communicating text information and an application for performing a function. The system also includes memory storing known text formats and a processor for processing the text information. The processor compares the text information to the known text formats and determines a text format of the text information. The processor also tags the text information according to the determined text format and further makes the tagged text information available to the application.

According to a further aspect of the present invention, a method is provided for identifying text information and making such text information available for one or more applications. The method includes the steps of providing an application for performing one or more functions, storing known text formats in memory, and providing text information made available by an electronic device. The method also includes the step of processing the text information, including comparing the text information to the known text formats and determining a text format of the text information. The method further includes the steps of tagging the text information according to the determined text format and making the tagged text information available to the application.

The system and method of the present invention advantageously analyzes text information and makes the text information available for applications, such as those implemented in connection with services onboard a vehicle. By determining the text format of text information, the text information can be employed to make more intelligible decisions for use with available applications.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings.

DETAILED DESCRIPTION OF PREFERRED EMBODIMENT

Figure 1:
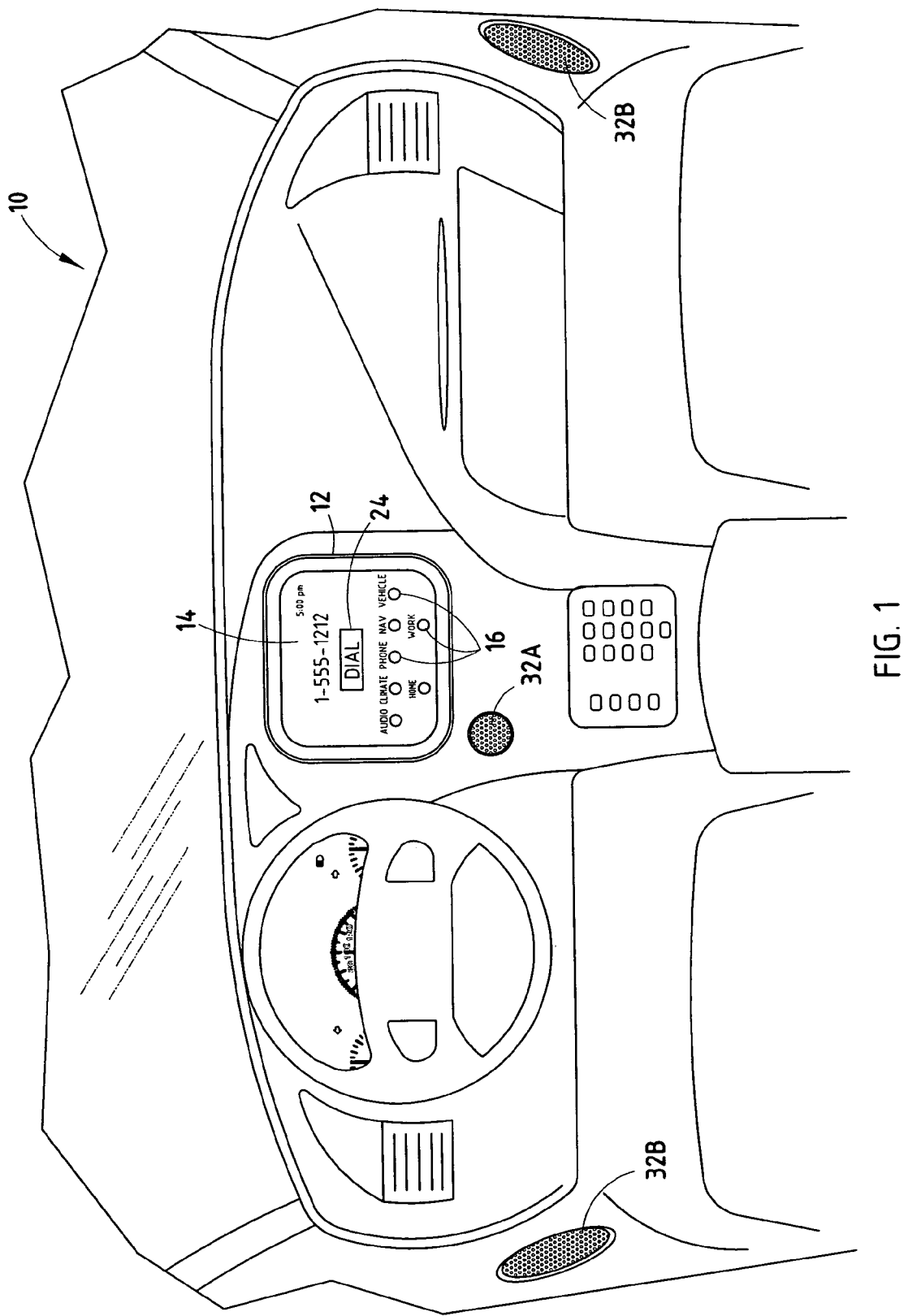
FIG. 1 is a perspective view of the cockpit of a vehicle equipped with an electronics (e.g., infotainment) system having integrated user interfaceable electronic devices.

Referring to FIG. 1, the cockpit of a vehicle 10 is generally illustrated having an integrated electronics system, also referred to herein as an infotainment system, according to one embodiment. The electronics (e.g., infotainment) system is generally located in the vehicle dashboard and made accessible to passengers in the vehicle 10. The infotainment system serves to provide any of a number of services which implement applications that perform functions as should be evident to those skilled in the art. These services may include handling a wide variety of information and providing informational services including entertainment services and telematics services, and thus may serve as an entertainment/telematics system.

The electronics system shown includes a main visual human machine interface (HMI) 12 in the form of a touch screen display 14 that allows passengers in the vehicle 10 to interface with the electronics system to communicate with one or more electronic devices to implement applications that are generally associated with services that are made available. The term electronic devices as referred to herein includes any of a wide variety of devices, systems, machines, and services employing analog and/or digital electronics to process and/or communicate data. The touch screen display 14 may include a conventional image display for displaying visual images and for providing a plurality of touch screen inputs, such as the "dial" input button 24 and the following menu inputs 16: audio input, climate input, phone input, navigation input, vehicle input, home input, and work input, as well as a wide variety of other menu selections (not shown). It should be appreciated that various user inputs and outputs may be made available with the HMI 12 for inputting and outputting information (data) including text that may be used with any of a plurality of electronic devices to allow a user to interface with the electronic devices.

Also shown located within the cockpit of the vehicle 10 is a microphone 32A and audio speakers 32B, which together form a voice-based HMI 32. The microphone 32A is an audio input device that allows for voice speech recognition to provide audio command inputs to the electronics system. The speakers 32B are audio output devices that may include audio entertainment speakers commonly employed for audio devices in the vehicle 10 and/or may include one or more audio speakers dedicated to providing voice audio outputs to passenger(s) in the vehicle 10. It should be appreciated that the electronics system, including the electronic devices and HMIs 12 and 32, may be located at various locations within the vehicle 10. In addition, the vehicle 10 may be equipped with other HMIs, such as a visual HMI employed in front of the rear passenger seat to allow occupants seated in the rear seat of the vehicle 10 to interface with an entertainment system and/or other electronic device(s).

Figure 2:
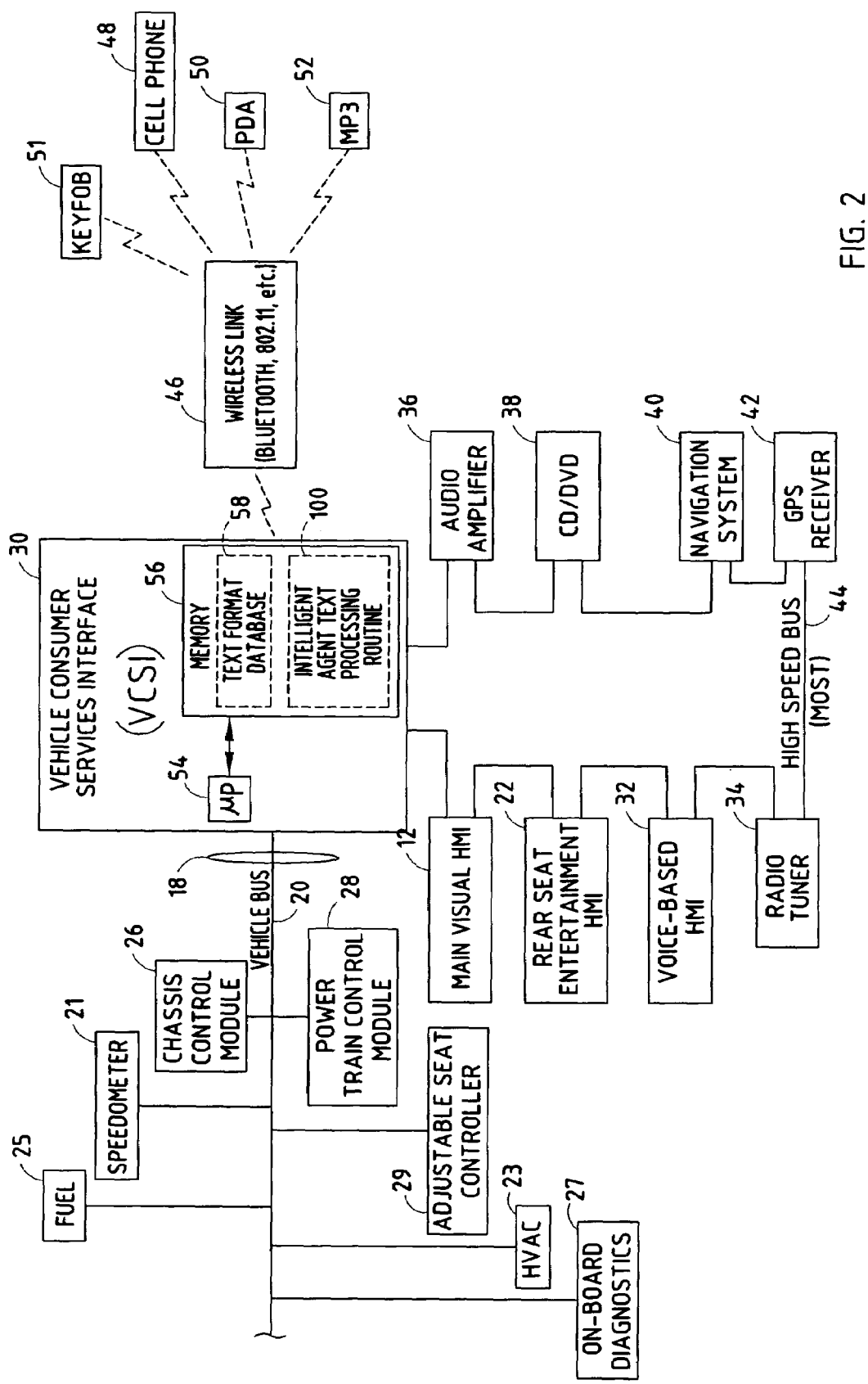
FIG. 2 is a block diagram illustrating a vehicle consumer services interface (VCSI) host platform interfacing with a plurality of electronic devices in the vehicle.

The electronics system also includes a plurality of information and entertainment host devices that may be used onboard the vehicle 10. Examples of various electronic host devices included with an infotainment system providing entertainment and telematics services onboard the vehicle 10 are illustrated in FIG. 2. These and other services made available may be implemented by executing one or more applications which perform functions. The electronics (e.g., infotainment) system includes various electronic devices coupled to a vehicle consumer services interface (VCSI) host platform 30. The VCSI host platform 30 interfaces with the various electronic host devices within the vehicle 10.

VCSI host platform 30 is shown coupled to the vehicle data bus 20, a high speed media oriented system transport (MOST) bus 44, and one or more wireless links 46. The vehicle bus 20 may include a conventional original equipment manufacture (OEM) bus, such as a CAN or J1850 bus, utilizing a proprietary or non-proprietary protocol dedicated to communicating information (data) among vehicle dedicated control devices including chassis control module 26 and power train control module 28. The vehicle data bus 20 is also shown coupled to various other vehicle devices and sensors including a vehicle speedometer 21; a fuel level sensor 25; onboard diagnostics 27; heating, ventilation and air conditioning (HVAC) controls 23; and adjustable seat controls 29, as well as various other vehicle devices (including services) as should be evident to those skilled in the art. The vehicle bus 20 is coupled to the VCSI host platform 30 via a firewall 18 which serves to shield mission critical functions of the vehicle 10 from potentially harmful communications.

The VCSI host platform 30 allows various electronic devices in the vehicle 10 to interface with each other, to interface with off-board electronic devices, and to interface with the HMIs. The VCSI host platform 30 serves as the interface between consumers, networks (both internal and external networks), electronic devices and services (factory installed or purchased by consumers "off-the-shelf"), and the vehicle 10. The VCSI host platform 30 serves as a bridge between different protocols to provide a standardized interface that makes the task of creating in-vehicle applications easy, and further serves to synchronize both automotive and non-automotive technology electronic devices to that of the vehicle 10. The applications provide services that may be implemented through intelligent electronic devices that reside on one or more of the networks.

The VCSI host platform 30 may implement network protocols already designed into the vehicle 10 and may enable communication between electronic devices (including services) residing on different networks. The VCSI host platform 30 may also implement application programming interfaces (APIs), thus enabling compatibility and communication between electronic devices (including services) provided by a variety of potentially different suppliers. It should be appreciated that the VCSI host platform 30 further includes a communication manager that handles the sending and receiving of messages that are communicated through the VCSI host platform 30.

The VCSI host platform 30 includes a compute platform, shown as a microprocessor 54 and memory 56, for storing and executing a plurality of software routines. The memory 56 in the VCSI host platform 30 includes both volatile and non-volatile memory, such as random access memory (RAM), read-only memory (ROM), electronically erasable programmable read-only memory (EEPROM) and flash memory. The microprocessor 54 serves as the processor and may include any data processing device capable of executing the various software routines.

The VCSI host platform 30 stores and executes a text processing routine 100, which may be implemented as an intelligent agent, and various applications to perform program services. The VCSI host platform 30 also manages the storage of text format information and other information regarding each of the services. It should be appreciated that the software routines implemented in the VCSI host platform 30 and elsewhere in the electronics system may employ object-oriented programming. An example of an object-oriented programming language may include JAVA, which is a commercially available software package. It should be appreciated that other programming languages may be employed.

The VCSI host platform 30 also contains a text format database 58 stored in memory 56, preferably within non-volatile memory. The text format database 58 contains pro forma text formats stored in memory that define known text formats. The text formats may include patterns of predefined characters, such as ASCII code characters. The text format database 58 may include any of a number of known text formats, such as an XML schema. Other examples of known text formats may include a contact information format, an address format, a telephone format, a date format, and an e-mail address format. The known text formats may be stored in memory 56 in advance, or may be added to memory 56 at any time to accommodate new text formats that may be used by future electronic devices and services employable onboard or off the vehicle 10.

The text processing routine 100 is stored in memory 56, preferably in non-volatile memory, and is executed by the processor to analyze text information to determine the text format and make the determined text information available to one or more application. The text processing routine 100 identifies text information, such as text presented in e-mails, calendars, to-do lists, etc., and compares the text information to the known text formats provided in database 58. The text information may be in the form of ASCII code, representing alphanumeric code (e.g., 1, 2, 3, A, B, C, etc.) and symbols (e.g., @, $, &, /, #, etc.). Routine 100 processes ASCII code text that may not be tagged with a text format and deciphers the type of text to make it available for other applications.

By knowing the text formats, the VCSI host platform 30 is able to compare text information communicated within the vehicle 10 to the known text formats and identify the text format. This allows for text data to be tagged and to be processed and made available for other applications, both on and off the vehicle 10. Applications employing the tagged text may execute functions to provide for enhanced services.

The high speed MOST bus 44 is implemented, in one embodiment, as a wire bus connected in communication with a plurality of electronic devices including the main visual HMI 12. Other HMI devices, including the rear seat entertainment HMI 22 and the voice-based HMI 32, are also connected to the high speed MOST bus 44. Electronic devices shown connected to the MOST bus 44 include a radio tuner, an audio amplifier 36, a compact disk/digital versatile disk (CD/DVD) player 38, a navigation system 40, and a global positioning system (GPS) receiver 42. The high speed MOST bus 44 allows data communication between each of the electronic devices coupled to the bus 44 and the VCSI host platform 30. It should be appreciated that the HMIs 12, 22 and 32 may be otherwise coupled in communication with the VCSI host platform 30 to provide data communication between a user and the VCSI host platform 30 or between the user and any of the electronic devices.

While the VCSI host platform 30 is referred to herein as the host platform, it should be understood that any of the host electronic devices (e.g., a radio tuner 34, CD/DVD player 38 and navigation system 40) may be configured to operate as the host platform to execute applications, communicate data, to store the text format database and to execute the text format processing according to the present invention. It should also be appreciated that other electronic devices having interface capability may serve to function as HMIs.

The VCSI host platform 30 is further able to communicate with various wireless electronic devices including consumer electronic devices such as a cell phone 48, a personal digital assistant (PDA) 50 and a media player (e.g., MP3 player) 52, via a wireless link 46. The PDA 50 may include any of a number of digital electronic devices generally having processing capability and memory for storing and communicating data information. For example, the PDA 50 may include a personal computing device (e.g., laptop computer, personal organizer, etc.) having a processor and Internet access. According to another example, PDA 50 may include a key fob 51 having memory for storing information that may be communicated to the vehicle 10 and for receiving and storing information from the vehicle 10. It should be appreciated that various other PDAs 50 may be utilized onboard the vehicle 10, as well as off-board the vehicle 10.

The consumer electronic devices including cell phone 48, PDA 50, MP3 player 52 and key fob 51 are portable and able to be transported in and out of the vehicle 10 and communicate data with the vehicle 10 via the wireless link 46. It should be appreciated that these consumer electronic devices and other devices may contain and communicate text information such as personal contact information, e-mail messages, calendars, to-do lists, itineraries and other personal information. The system and method of the present invention advantageously identifies such text information, compares it to text formats, tags the text data according to the text format(s) and makes the tagged text information available to other applications onboard or off the vehicle 10.

The wireless link 46 may include any of a number of wireless communication links including, but not limited to, Bluetooth and 802.11B (also known as Wi-Fi). Bluetooth provides for wireless communication generally within a short range (e.g., 10 meters) while 802.11B provides enhanced range (e.g., 300 meters) wireless data communication. It should be appreciated that other wire and wireless links, including long range (beyond 300 meters) wireless links may be employed to provide data communication between electronic devices employed onboard and/or off the vehicle 10 and one or more other wireless communication devices.

It should be appreciated that a user may interface with any of the wireless devices (e.g., cell phone) via any of the HMIs 12, 22, and 32 communicating via the VCSI host platform 30. Additionally, any of the wireless devices may also operate as the host platform to execute applications, communicate data, store text formats, analyze and tag the text, and make the tagged text available to one or more applications according to the present invention.

The electronics system, referred to in one embodiment as the vehicle infotainment system, includes the integration of a number of electronic devices (including systems, machines and services) that offer entertainment and telematics applications (functions) to allow for enhanced operation of a plurality of onboard and off-board electronic devices and services. To manage the complexity of the in-vehicle infrastructure resulting from integrated use of a plurality of electronic devices and services, an application programming interface (API) is employed in conjunction with the text format data containing the text formats to analyze and determine the text format type and to make the determined text information available for one or more applications.

In the embodiment shown and described herein, the text format storage and text processing is implemented in the VCSI host platform 30 which serves as a processor. One example of a VCSI host platform used for communicating data within a vehicle is disclosed in U.S. application Ser. Nos. 10/695,717; 10/696,078; 10/696,473; 10/696,597 and 10/696,692 all filed on Oct. 29, 2003, all commonly assigned to the assignee of the present application. The entire disclosures of each of the aforementioned patent applications are hereby incorporated herein by reference. While the text format storage and text processing implemented herein is described in connection with the VCSI host platform 30, it should be appreciated that the text format storage and text processing may be implemented (stored and executed) in any of a variety of electronic devices, preferably having processing capability and memory for storing the text format database and executing the text processing routine, including initiating any corresponding actions (e.g., executing an application using the determined text).

Figure 3:
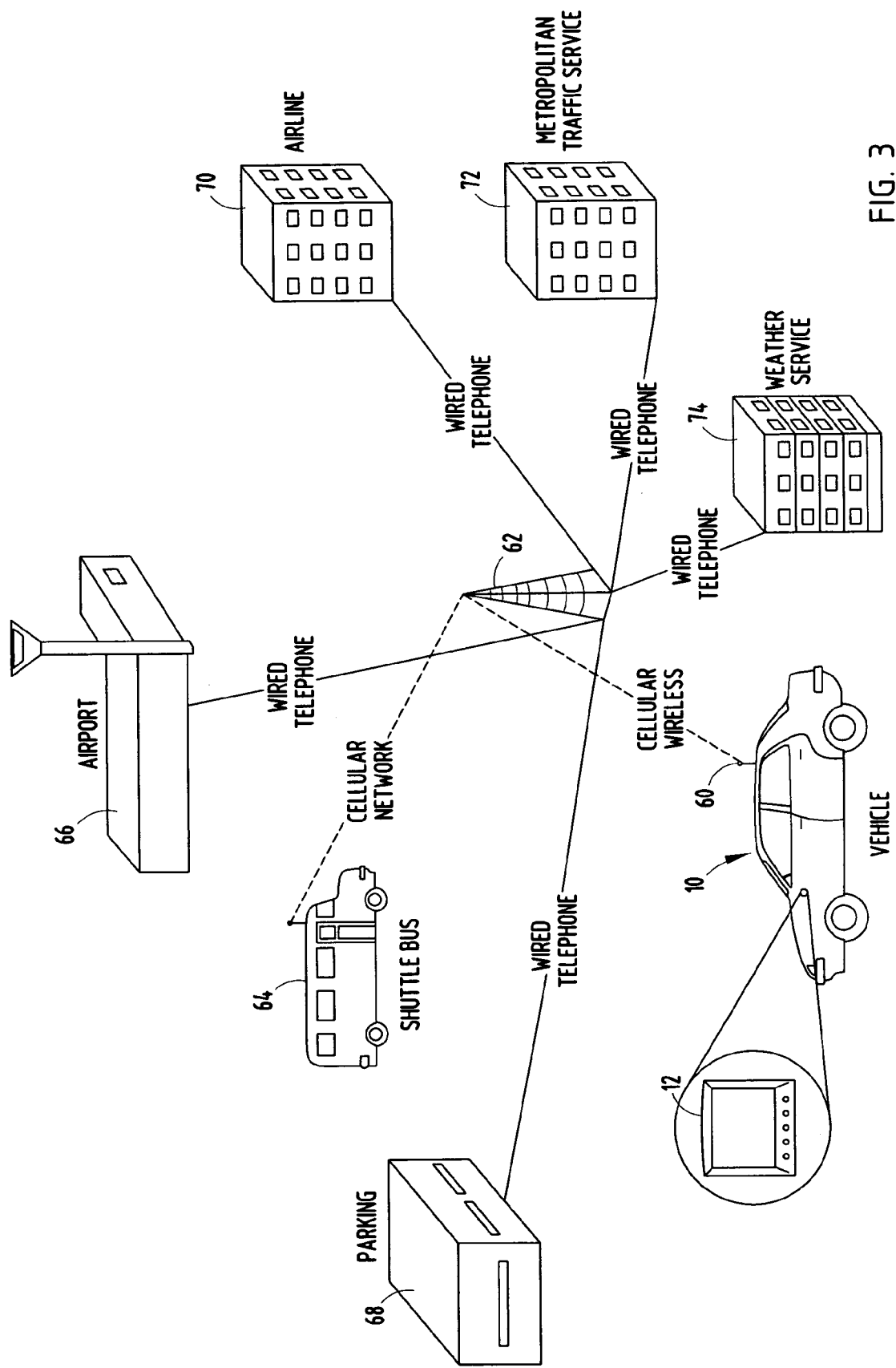
FIG. 3 is a block diagram illustrating one example of an airline travel itinerary application.

Referring to FIG. 3, vehicle 10 is generally illustrated in a driving scenario employing the text processing of the present invention for use in an airport travel related application, according to one example. The vehicle 10, equipped with electronics system and HMI 12, communicates via antenna 60 and cellular wireless communication with a communication tower 62. The communication tower 62, in turn, may communicate information with various remote communication systems. This may include a wired telephone connection to an airport 66, a cellular network connection to a shuttle bus 64, a wired telephone connection to a parking complex 68, and a wired telephone connection to one or more airlines 70. Additionally, the communication tower 62 may communicate with a metropolitan traffic service 72 and a weather service 74, both via wired telephone connections. Thus, the vehicle 10 is capable of communication information with various remote communication systems.

In the example given, text information acquired, such as by e-mail, calendar entries, to-do lists, or other sources, may be analyzed and employed in the airport travel related application to perform various functions. These functions may include polling airlines for flight times, polling a navigation system on the vehicle 10 to determine time needed to travel to the airport 66, and polling the airport 66 and/or parking complex 68 for the time needed to park the vehicle 10, check-in to the airport, get through security, and get to the airport gate. When a user's calendar application determines it is time to depart for the airport 66, the application may notify the user. When the user starts the vehicle 10, the vehicle 10 may report its position and status information to the airline 70, airport 66, fueling station, drive-thru restaurant and other destinations. If it is determined that a passenger with a reservation is not able to make a particular airline flight, the airline 70 may acquire that information in time to fill the reserved seat. If the passenger arrives before the scheduled flight time, the airline 70 can be notified to hold the reserved seat. This will save the passenger and the airline time, money and anxiety, and may avoid wasted trips. In this example, the vehicle 10 utilizes several electronic devices and services such as a navigation system with route guidance, a cellular telephone or other wireless network technology, and a variety of information (e.g., calendar, itinerary information, etc.) residing on one or more portable devices, such as a PDA or cellular phone.

The text processing routine 100 looks at text strings found in personal information management (PIM) data, such as that commonly presented in personal calendar entries, to-do lists, e-mails, etc., to determine context (e.g., meeting, flight, doctor appointment, etc.) and to initiate one or more applications based on the data (information). Context is defined as a category (type) of information. Each context generally has a unique set of parameters. Some of the parameters may be unique to the individual user. In some cases, the user may be prompted for input if the data found in the original text string is insufficient. Once context has been determined, the data is compared to a text format pro forma(s) (such as an XML schema) to determine what data is needed to initiate one or more applications. The text format(s) generally includes patterns of predetermined characters, such as ASCII characters.

The text processing routine 100 may look to the source of personalization information to determine which applications to initiate and whether or not to use default values.

XML (eXtensible Markup Language) is generally an ideal choice of text communication language because various industries use XML schemas to define standard parameters necessary for interaction with others. These and other text format schemas can serve as a pro forma that help conceptualize data and link such data with related services. If the text data is tagged based on definitions used by a given industry, the text messages sent will be compatible with the service provider. In the example of a mass transit flight application, the airline industry typically communicates text in a standard XML schema that is readily recognized throughout that industry. This includes the communication of text in a predetermined standard text format.

Once a personal calendar or other source for personal information has been accessed or uploaded into the vehicle 10, a context agent reviews the text information contained therein. The text information is compared against one or more text format pro formas (XML schema) to determine the type of entry and what is needed before contacting the airline and/or other related service providers. For example, if the entry contains text that describes a flight number, departure time/ date, and/or airline name, the text processing system can conclude that this text is a flight and run any necessary applications. The electronics system can then verify flight departure time and gate information, make a parking reservation, check weather, and do anything else the individual user needs done.

If there is inadequate text data to determine context, the context agent can narrow the scope to possible context and prompt the driver for clarification or connect to one or more off-board sources to determine the proper context. For example, if the text entry appears to have a flight time or number and the name of an airline, the text processing system can contact the airline to verify that the flight exists and fill in the rest of the text data from the response.

According to the above-described airline travel application, examples of text data that may be useful for service applications in such a travel scenario include the following: airline name, flight number, time of departure, arrival time, confirmation number, gate, terminal, flight destination, check list, parking area, route, estimated time of arrival (ETA), vehicle status, as well as other text fields. For each type of industry, there may exist various required fields of text data that are necessary to complete the information. These fields of text data may be provided in a standard text format accepted by that industry. Known text formats may be loaded into the memory 56 and stored in the text format database 58. Whenever the vehicle 10, any device, or service processes an application involving another device or service, any new text formats may be downloaded into the text format database 58 and processed by the text processing routine 100.

Figure 4:
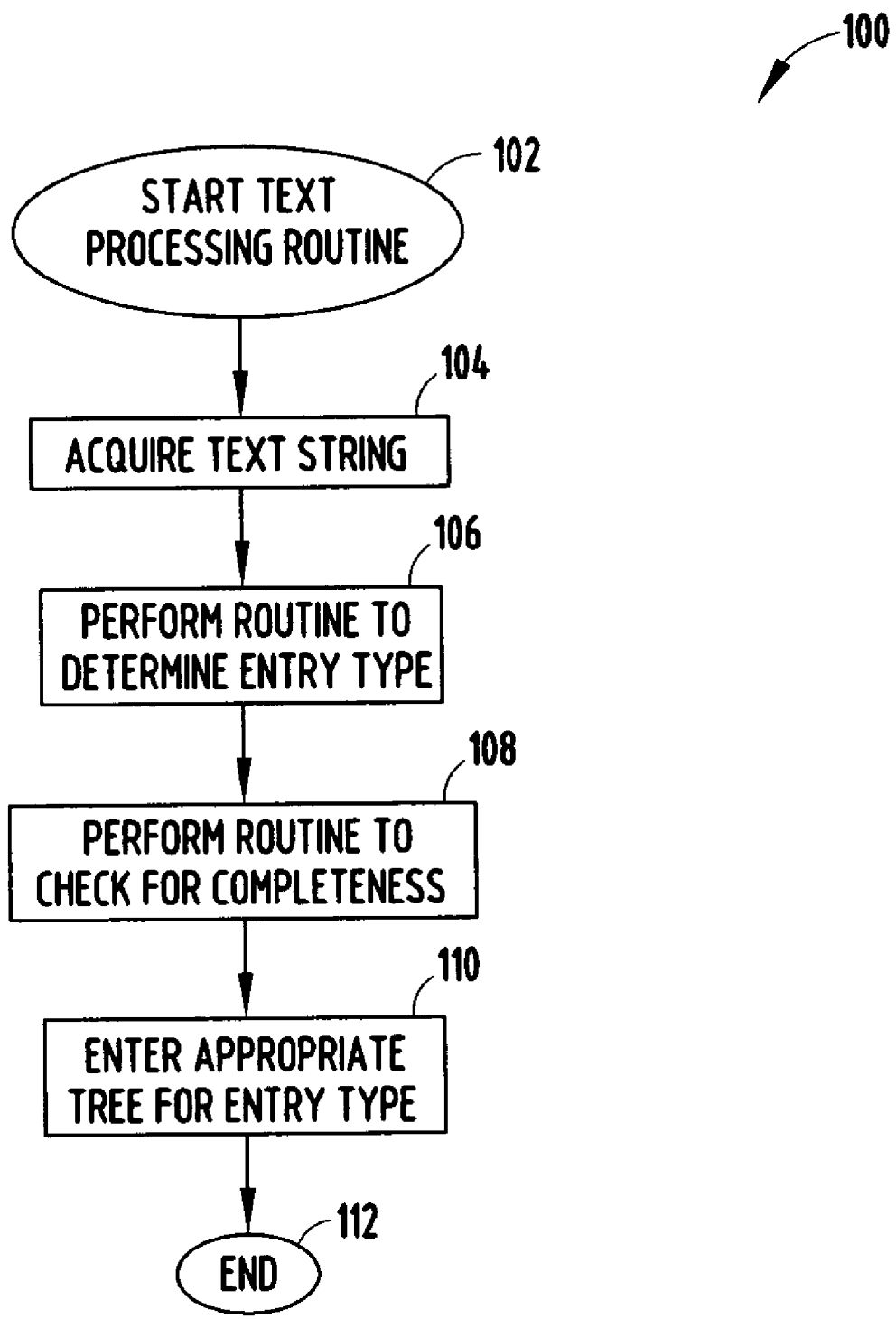
FIG. 4 is a flow diagram illustrating a routine for identifying and processing text information and making the text information available to an application according to the present invention.

Referring to FIG. 4, the text processing routine 100 is generally illustrated for analyzing text information, tagging identified text information, and applying the tagged text information to one or more applications. The text processing routine 100 begins at step 102 and proceeds to acquire a text string in step 104. A string of text may be acquired via various electronic devices (including services) available onboard and off the vehicle 10. For example, a text string may be acquired from an e-mail message, a calendar entry, a to-do list, textual or voice translated communications, and other sources of text information that are available.

When a text string includes identification of its text format, the identified text format provided is used. In this situation, the text may already be tagged or may subsequently be tagged to identify its text format. When no such text format is provided, the text processing routine 100 performs a routine 106 to determine the text entry type as explained in connection with the flow diagram in FIG. 5. Following determination of the text entry type, text processing routine 100 performs a routine 108 to check for the completeness of the determined text entry type as explained in connection with the flow diagram shown in FIG. 6. Thereafter, text processing routine 100 initiates (enters) an appropriate tree application pursuant to routine 110 for the determined text entry type. The entry tree application may include applying the tagged data to one or more applications, such as that shown in the flow diagram in FIG. 7.

Figure 5:
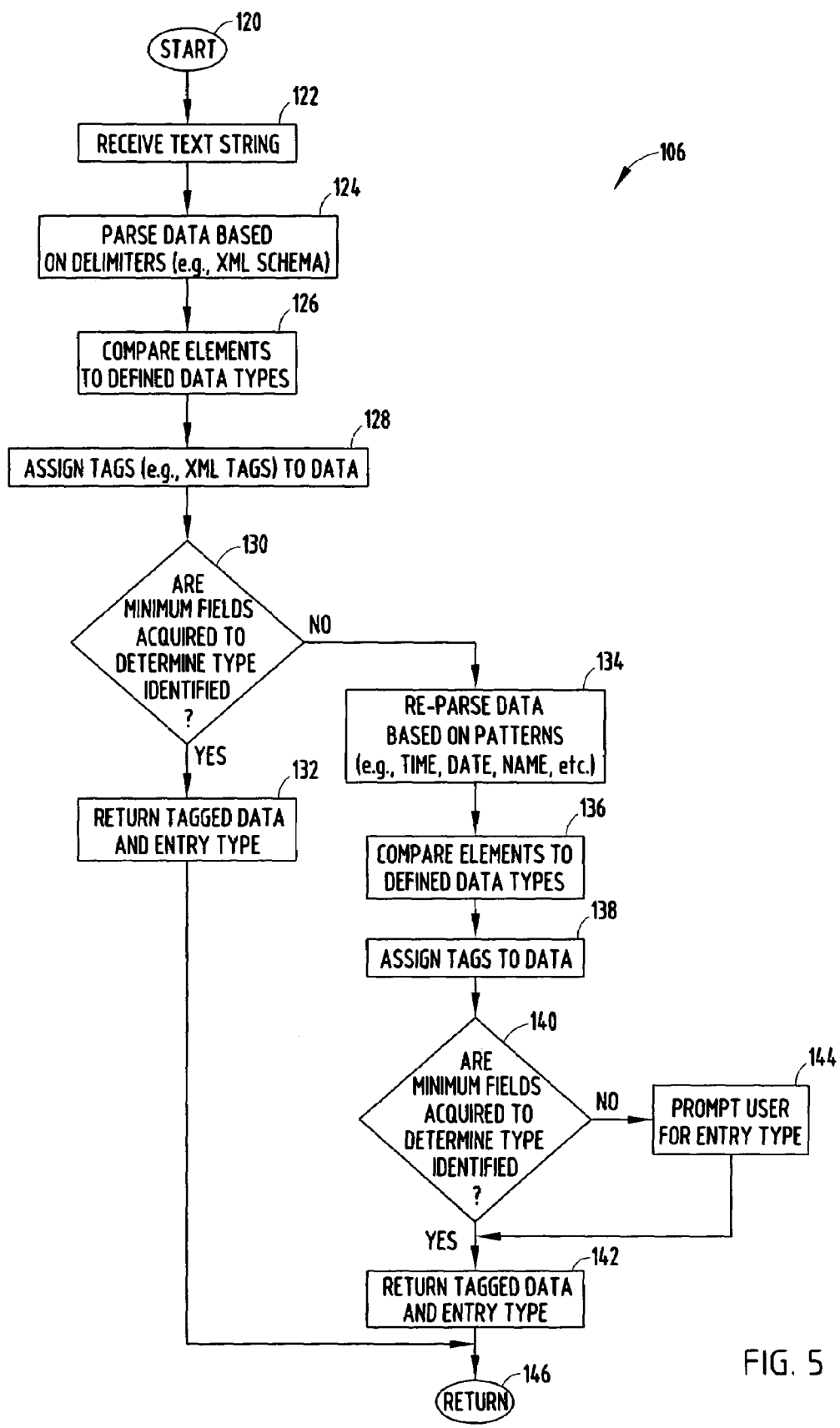
FIG. 5 is a flow diagram illustrating a method of determining a type of text entry in the routine shown in FIG. 4.

The routine 106 for determining entry type is illustrated in greater detail in FIG. 5. Routine 106 begins at step 120 and proceeds to receive the text string in step 122. The data in the text string is then parsed based on delimiters (e.g., XML schema) in step 124. The delimiters may look for recognizable format types and break the text into parts. Following the parsing of the text string data, the delimited elements of the parsed text data are compared to defined text data types in step 126. This includes comparing the text element types to the known text formats stored in database 58. According to one embodiment, the comparison may be achieved by use of pattern recognition. Whenever a service or application(s) is employed which has a new text format, the new text format may be downloaded into the text format database 58 and used to compare to future parsed text elements.

Once the text data has been compared to defined data format types, routine 106 assigns tags (e.g., XML tags) to the text data in step 128. The assigned tags identify the text format associated with the text string. Examples of a tag may include a label or parameter name, which may be applied in XML or other software language.

Proceeding to decision step 130, routine 106 checks whether a sufficient number of minimum fields have been acquired to determine the type of text identified. If the minimum number of fields have been acquired, routine 106 returns the tagged data and entry type in step 132, before returning to the text processing routine 100 in step 146.

If the minimum number of fields have not been acquired to determine the type of text identified, routine 106 proceeds to step 134 to re-parse the text data based on patterns. The patterns may include time, date, name, e-mail address and any other data that may relate to available services or applications. The re-parsed text elements are then compared to the defined text format types set forth in the text format database.

The system and method of the present invention uses the analysis of predefined ASCII characters, according to one embodiment, to find values that are missing for a number of parameters (or variables) needed by available services. For instance, in the flight scenario the application (service) needs to know the flight number, flight time, airline, etc. These parameters have no values initially, but are registered as parameters related to an available service. The text processing system recognizes the text pattern and associates the recognized text pattern with one of these parameters. Then, the parameter (with appropriate value assigned) is made available to the application (service).

According to one example, if the following context information is determined: FLIGHT_NUMBER=" ", after evaluating the text in a calendar entry, the text processing system can determine FLIGHT_NUMBER="2374." Likewise, if the determined context is a flight, the text processing system can look for capitalized names and find that AIRLINE="Northwest." These and other elements are passed to the application (service). They might also be represented in the following format "AIRLINE (Northwest)" in XML.

Next, in step 138, tags are assigned to the re-parsed data elements. At this point, routine 106 again checks for whether there have been a minimum number of fields acquired to determine the type identified. If a minimum number of fields have been acquired, routine 106 returns the tagged text data and entry type in step 142, before returning to the text processing routine 100 in step 146. If the minimum number of fields have not been acquired, routine 106 will prompt the user for an entry type in step 144. This may include asking a user to enter the text entry type or may include providing multiple text entry type selections for a user to choose from. If the user enters the entry type, the tagged text data and entry type are returned in step 142 before returning to the text processing routine 100 in step 146.

Figure 6:
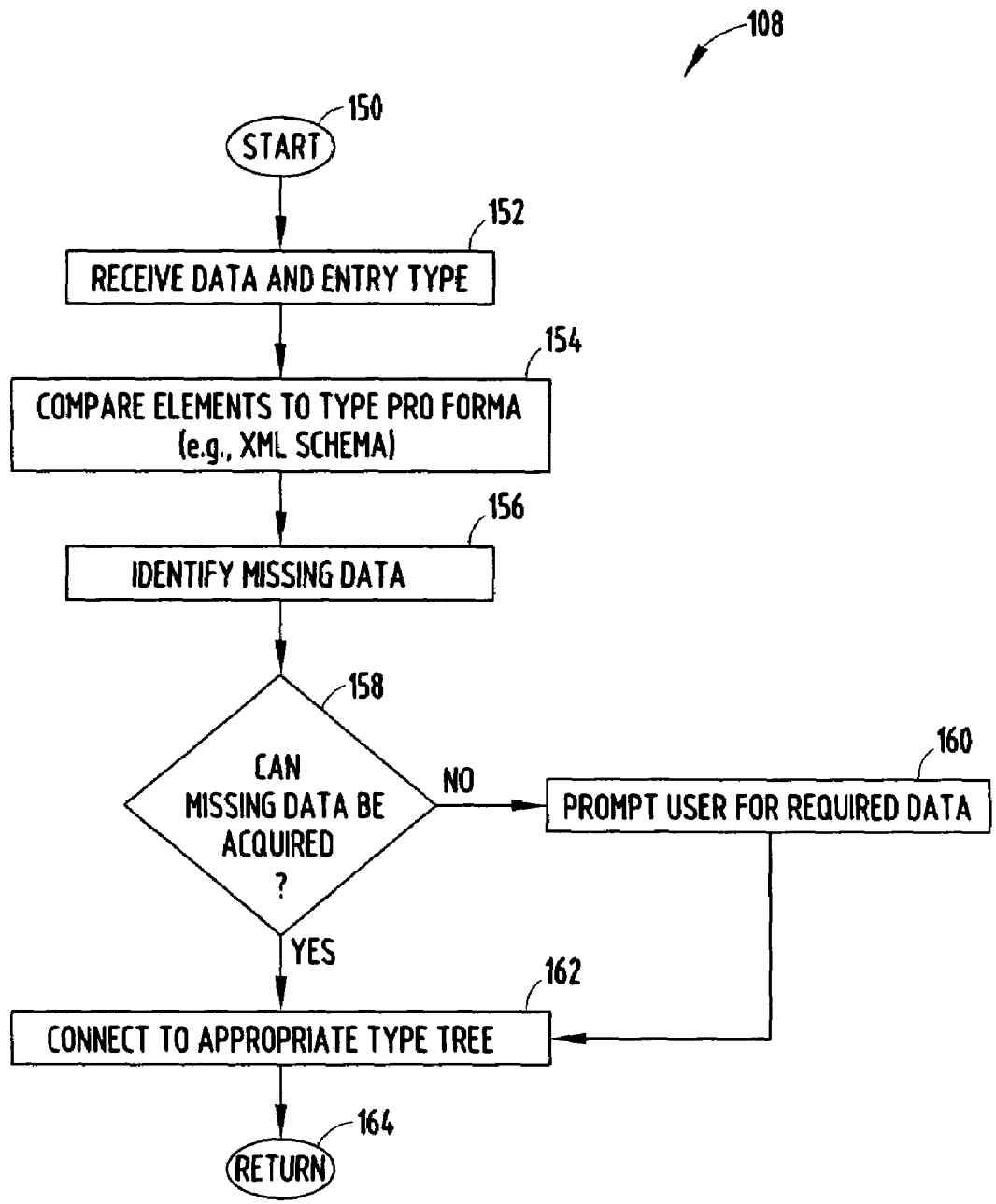
FIG. 6 is a flow diagram illustrating a method of checking for completeness in the routine shown in FIG. 4.

Once the text entry type is determined, routine 108 is performed as shown in FIG. 6. Routine 108 begins with step 150 and proceeds to receive the text data and entry type in step 152, and then compares text elements to the text format pro forma in step 154. This may include comparing text elements to an XML schema or other known text format pro forma(s). Routine 108 then identifies any known missing data in step 156. For example, in an airline travel application, more data may be required to launch the application. This missing data can be acquired from other sources or from the user.

Routine 108 proceeds to decision step 158 to determine if the missing text data can be acquired. If the missing text data can be acquired, routine 108 proceeds to step 162 to connect to the appropriate type tree application before returning in step 164. If the missing text data cannot be acquired, routine 108 proceeds to prompt the user for the required data in step 160. Once the user provides the required data, routine 108 connects to the appropriate type tree application in step 162 before returning to the text processing routine 100 in step 164.

Figure 7:
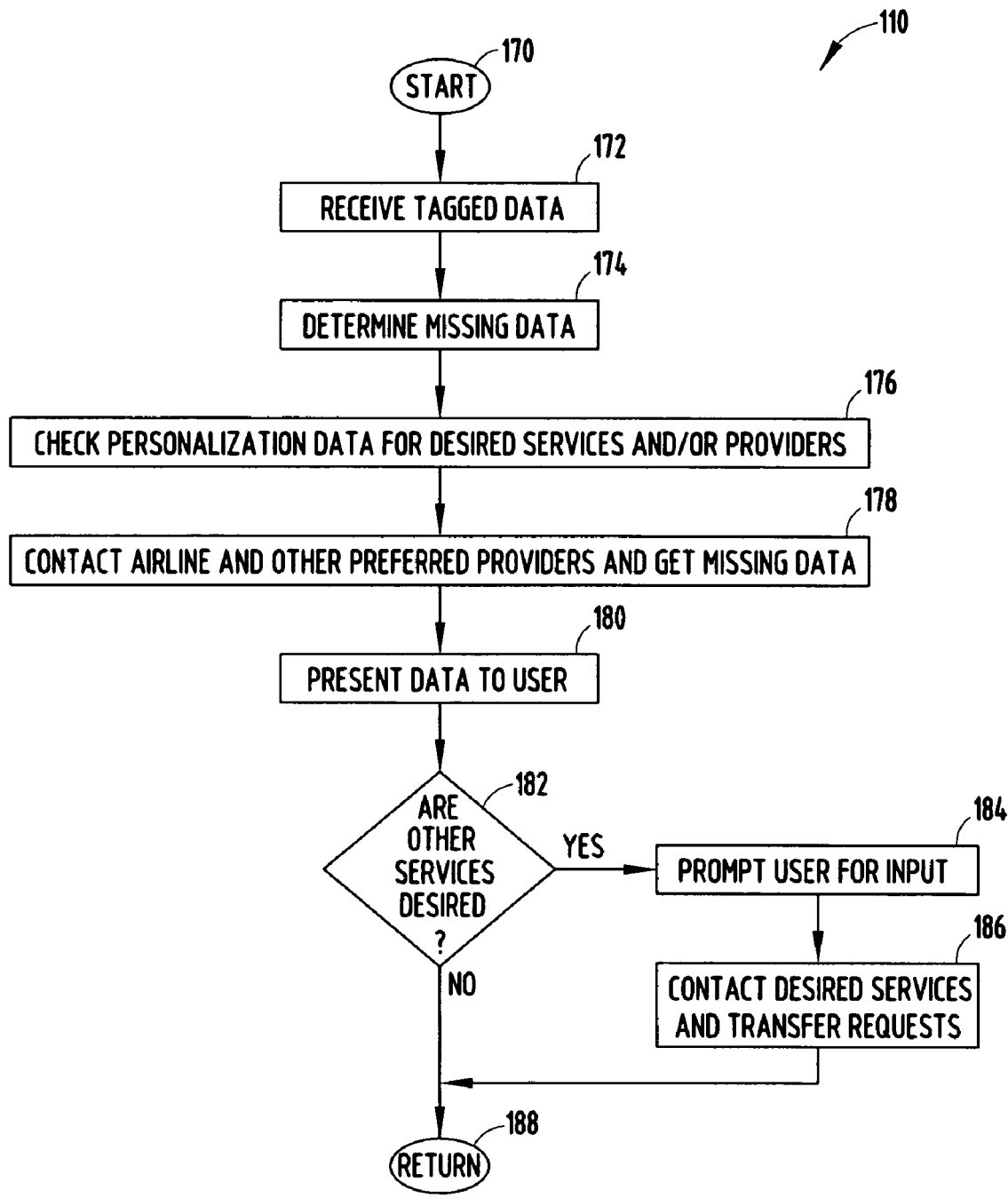
FIG. 7 is a flow diagram illustrating a method of performing a flight calendar entry application, according to one example.

One example of an appropriate type tree application is provided in routine 110 illustrated in FIG. 7. Routine 110 begins at step 170 and proceeds to receive the tagged text data in step 172. Next, routine 110 determines any missing text data in step 174 and then checks personalization data for desired services and/or providers in step 176. In the example shown, routine 110 proceeds to contact an airline or other preferred provider to get any missing data in step 178. The acquired missing data is then presented to the user in step 180.

Routine 110 determines whether there are other services employing useful applications that are desired and, if not, returns in step 188. If other services are desired, routine 110 prompts the user for input in step 184. Following input from the user, routine 110 contacts the desired service(s) and transfers the requests in step 186, before returning to text processing routine 100 in step 188.

Accordingly, the system and method of the present invention advantageously analyzes text information and determines the text format corresponding to the text information. By determining the type of text format corresponding to the text information, the system and method can make the text information available to other applications, thereby providing for a more integrated system, which is particularly useful on a vehicle. While the system and method have been described in connection with use onboard a vehicle 10, it should be appreciated that the system and method of the present invention may also be employed off-board vehicles.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A system for identifying text information and making the text information available for one or more applications, said system comprising:
 a vehicle consumer services interface;
 an electronic device communicating text information to the vehicle consumer services interface via a wireless link, wherein the electronic device comprises personal digital assistant functionality;
 an application for performing a function;
 memory provided in the vehicle consumer services interface for storing a text format database comprising pro forma text formats that define known text formats, wherein the pro forma text formats comprise patterns of predefined characters; and
 a processor provided in the vehicle consumer services interface for processing the text information, said processor comparing the text information to the known pro forma text formats to recognize a character pattern of the text information and determining a text format of the text information, wherein the processor tags the text information according to the determined text format based on an XML schema and makes the tagged text information available to the application.

2. The system as defined in claim 1 further comprising the step of initiating the application for a service.

3. The system as defined in claim 1, wherein the electronic device and processor are locatable in a vehicle.

4. The system as defined in claim 3, wherein the vehicle consumer services interface allows the electronic device to interface within the vehicle.

5. The system as defined in claim 1, wherein the patterns are defined within one or more XML schemas.

6. The system as defined in claim 1, wherein the predefined characters are ASCII characters.

7. The system as defined in claim 1, wherein the text information comprises personal information.

8. The system as defined in claim 1, wherein the application employs the tagged text information.

9. A method of identifying text information and making the text information available for one or more applications, said method comprising the steps of:
 providing a vehicle consumer services interface comprising memory and a processor;
 communicating text information from an electronic device to the vehicle consumer services interface via a wireless link, wherein the electronic device comprises personal digital assistant functionality;
 providing an application for performing one or more functions;
 storing known pro forma text formats in a text format database in the memory, wherein the pro forma text formats comprise patterns of predefined characters;
 providing text information made available by the electronic device; and
 wherein the processor performs step of processing the text information, including comparing the text information to the stored known pro forma text formats to recognize a character pattern of the text information and determining a text format of the text information, tagging the text information according to the determined text format based on an XML schema, and making the tagged text information available to one or more applications.

10. The method as defined in claim 9, wherein the one or more services are made available onboard a vehicle.

11. The method as defined in claim 9, wherein the processing step occurs onboard a vehicle.

12. The method as defined in claim 9, wherein the electronic device is locatable on a vehicle.

13. The method as defined in claim 12, wherein the vehicle consumer services interface allows the electronic device to interface with a vehicle.

14. The method as defined in claim 9, wherein the patterns are defined within one or more XML schemas.

15. The method as defined in claim 9, wherein the predefined characters comprise ASCII characters.

16. The method as defined in claim 9, wherein the text information comprises personal information.

17. The method as defined in claim 9, further comprising the step of applying the tagged text information to the application.

* * * * *